US010506677B2

(12) United States Patent
Yamada (10) Patent No.: US 10,506,677 B2
(45) Date of Patent: Dec. 10, 2019

(54) LIGHT SOURCE DEVICE, PROJECTION TYPE DISPLAY DEVICE, AND SEMICONDUCTOR DEVICE

(71) Applicant: SEIKO EPSON CORPORATION, Tokyo (JP)

(72) Inventor: Atsushi Yamada, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/258,182

(22) Filed: Jan. 25, 2019

(65) Prior Publication Data

US 2019/0239300 A1 Aug. 1, 2019

(30) Foreign Application Priority Data

Jan. 26, 2018 (JP) ................................ 2018-011315

(51) Int. Cl.
*H05B 37/02* (2006.01)
*H05B 33/08* (2006.01)
*G03B 21/20* (2006.01)

(52) U.S. Cl.
CPC ..... *H05B 33/0818* (2013.01); *G03B 21/2033* (2013.01); *H05B 33/0845* (2013.01); *H05B 33/0851* (2013.01)

(58) Field of Classification Search
CPC .......................... H05B 33/0845; H05B 33/0851
USPC .................................. 315/291, 300, 307, 308
See application file for complete search history.

(56) References Cited

U.S. PATENT DOCUMENTS

| 2010/0148681 | A1* | 6/2010 | Kuo | ................... | H05B 33/0818 |
| | | | | | 315/193 |
| 2010/0219766 | A1* | 9/2010 | Kuo | ................... | H05B 33/0818 |
| | | | | | 315/224 |
| 2015/0340950 | A1* | 11/2015 | Wibben | ............. | H05B 33/0845 |
| | | | | | 323/288 |
| 2016/0353533 | A1 | 12/2016 | Gyoten et al. | | |
| 2018/0180978 | A1* | 6/2018 | Yamada | ............. | H05B 33/0815 |

FOREIGN PATENT DOCUMENTS

JP    2016-225285 A    12/2016

* cited by examiner

*Primary Examiner* — Thuy V Tran
(74) *Attorney, Agent, or Firm* — Oliff PLC (57) ABSTRACT

A light source device includes: a semiconductor light source; a switching element connected in series to the semiconductor light source; a drive circuit that turns on the switching element when a first control signal based on a PWM signal is in a first logic state; a switching power supply circuit that supplies a current to the semiconductor light source; a current detection element that detects a current flowing through the semiconductor light source and generates a current detection signal; a current detection circuit that sample-holds a current detection signal for a period shorter than an activation period of the PWM signal; an error amplifier that generates an error signal by amplifying the difference between a current control signal and an output signal of the current detection circuit; and a control circuit that generates a second control signal for controlling the switching power supply circuit based on the error signal.

9 Claims, 3 Drawing Sheets

LIGHT SOURCE DEVICE, PROJECTION TYPE DISPLAY DEVICE, AND SEMICONDUCTOR DEVICE

BACKGROUND

1. Technical Field

The present invention relates to a light source device that uses a semiconductor light source, and a projection type display device that uses such a light source device. Furthermore, the invention relates to a semiconductor device or the like that is suitable for use in such a light source device.

2. Related Art

Digital light modulation and analog light modulation are known as methods for adjusting the brightness of a light source device that uses a semiconductor light source such as a laser diode or a light emitting diode. For example, digital light modulation is realized by performing PWM (Pulse Width Modulation) control on a switching element that is connected in series to a semiconductor light source so as to adjust the length of a period during which a current flows through the semiconductor light source. On the other hand, analog light modulation is realized by controlling a switching power supply circuit that supplies a current or a voltage to a semiconductor light source so as to adjust the amount of a current that flows through the semiconductor light source.

FIG. 2 in JP-A-2016-225285, which is a piece of related technology, shows a waveform of a current that flows through a semiconductor laser diode 102 (FIG. 1) when the on-time ratio in PWM control is changed while the output voltage of a switching power supply 101 (FIG. 1) is kept constant. Also, FIG. 3 in JP-A-2016-225285 shows a change in the average value of a current flowing through the semiconductor laser diode 102 when the on-time ratio in PWM control is changed while the output voltage of the switching power supply 101 is kept constant.

As shown in FIGS. 2 and 3 in JP-A-2016-225285, when the on-time ratio in PWM control decreases from 100% to 50% or 20%, the waveform of a current flowing through the semiconductor laser diode 102 is a saw-tooth like waveform instead of being a rectangular wave, which causes the average value of a current to fall below the target average value of the current, and therefore the light output (light flux) of the semiconductor laser diode 102 is smaller than the target value.

In JP-A-2016-225285, a target value setting unit sets a target value table for setting the target average value of a current by using a characteristic curve obtained when the semiconductor light source is actually driven. If the target average value of a current is compared with the average value of the current flowing through the semiconductor laser diode, and the switching power supply is feedback-controlled using this comparison output, the average value of the current flowing through the semiconductor laser diode is made equal to the target average value of the current, which is set by the target value setting unit according to the on-time ratio in PWM control.

However, the waveform of a current flowing through the semiconductor laser diode is not improved in JP-A-2016-225285. In order to linearly control the average value of a current flowing through the semiconductor laser diode according to the on-time ratio in PWM control, the target value table needs to be set by evaluating the characteristic curve of the semiconductor light source obtained when actually driven for each of the light source devices. For example, in order to make the average value of a current flowing through the semiconductor laser diode be 20% of a maximum value, the on-time ratio in PWM control needs to be set to 20%+a for each of the light source devices, where a needs to be adjusted for each device.

SUMMARY

An advantage of some aspects of the invention is to make the waveform of a current flowing through a semiconductor light source approach that of a rectangular wave, and improve the linearity of the average value of the current flowing through the semiconductor light source with respect to the duty ratio of a PWM signal without necessarily using a target value table that is to be set using the characteristic curve of the semiconductor light source obtained when actually driven. Another advantage of some aspects of the invention is to provide a projection type display device using such a light source device. Furthermore, another advantage of some aspects of the invention is to provide a semiconductor device or the like that is suitable to be used in such a light source device.

A light source device according to Application example 1 includes: a semiconductor light source; a switching element connected in series to the semiconductor light source; a drive circuit configured to turn on the switching element when a first control signal based on a PWM signal is in a first logic state; a switching power supply circuit configured to supply a current to the semiconductor light source; a current detection element configured to detect a current flowing through the semiconductor light source and generate a current detection signal by; a current detection circuit including a sample-hold circuit that sample-holds the current detection signal for a period that is shorter than an activation period of the PWM signal, when the PWM signal is activated; an error amplifier configured to generate an error signal by amplifying the difference between a current control signal and an output signal of the current detection circuit; and a switching power supply control circuit configured to generate a second control signal for controlling the switching power supply circuit based on the error signal.

According to Application example 1, the sample-hold circuit sample-holds the current detection signal for a period shorter than the activation period of the PWM signal, when the PWM signal is activated, and therefore, if the waveform of the current flowing through the semiconductor light source approaches a saw-tooth like waveform when the duty ratio of the PWM signal is small, the current detection signal can be sampled and held at a value smaller than the average value of the current detection signal over the sampling period.

Accordingly, as a result of controlling the switching power supply circuit based on the sampled value of the current detection signal, the current flowing through the semiconductor light source increases relative to the case where the sample-hold circuit is not used. As a result, the waveform of the current flowing through the semiconductor light source approaches that of a rectangular wave, and the linearity of the average value of the current flowing through the semiconductor light source with respect to the duty ratio of the PWM signal can be improved without necessarily using a target value table that is to be set using the characteristic curve of the semiconductor light source obtained when actually driven.

Here, the light source device may further include a timing generation circuit configured to generate a sampling pulse based on the PWM signal, and supply the sampling pulse to the sample-hold circuit. With this configuration, the sample-hold circuit is caused to start a sample-hold operation at a timing when the PWM signal is activated and a current starts to flow through the semiconductor light source.

Also, the sampling period in the sample-hold circuit is desirably shorter than or equal to the activation period of the PWM signal. In this case, even if the activation period of the PWM signal is reduced, the current detection signal can be accurately sampled.

Furthermore, the switching power supply control circuit desirably generates the second control signal such that the amount of increase in a current flowing through the semiconductor light source when the difference between the current control signal and the output signal of the current detection circuit is a second value is larger than the amount of increase in a current flowing through the semiconductor light source when the difference between the current control signal and the output signal of the current detection circuit is a first value, the second value being larger than the first value. In this case, the amount of increase in the current is increased as the waveform of the current flowing through the semiconductor light source approaches that of a saw-tooth like waveform, and the waveform of the current flowing through the semiconductor light source can be improved.

Also, a configuration may be adopted in which charges held in the sample-hold circuit approach zero for a period in which the PWM signal is deactivated. With this, when the PWM signal is next activated, the voltage of the output signal of the sample-hold circuit can be brought to approximately zero. Alternatively, the sample-hold circuit may reset the held charges in a deactivation period of the PWM signal. With this, when the PWM signal is next activated, the voltage of the output signal of the sample-hold circuit can be brought to approximately zero.

In the above-described aspects, the current detection circuit may further include a current sense amplifier that amplifies an output signal of the sample-hold circuit. In order to perform high-speed operations, the sample-hold circuit having a small capacitance needs to be directly connected to the current detection element. As a result of providing the current sense amplifier, the output signal of the sample-hold circuit is amplified to have a sufficient voltage, and the amplified signal can be supplied to the error amplifier.

A projection type display device according to Application example 2 includes any of the light source devices described above. According to Application example 2, the luminance of a projected image can be accurately controlled using the light source device in which the linearity of the average value of the current flowing through the semiconductor light source with respect to the duty ratio of the PWM signal has been improved without necessarily using a target value table that is to be set using the characteristic curve of the semiconductor light source obtained when actually driven, while simplifying the circuit configuration of the projection type display device. With this, the adjustment of the duty ratio to be performed on each device before shipment can be omitted.

A semiconductor device according to Application example 3 includes: a drive circuit configured to turn on a switching element that is connected in series to a semiconductor light source when a first control signal based on a PWM signal is in a first logic state; a switching power supply control circuit configured to generate a second control signal for controlling a switching power supply circuit that supplies current to the semiconductor light source; a current detection circuit including a sample-hold circuit that sample-holds a current detection signal that is generated by detecting a current flowing through the semiconductor light source, for a period shorter than an activation period of the PWM signal, when the PWM signal is activated; and an error amplifier configured to generate an error signal by amplifying the difference between a current control signal and an output signal of the current detection circuit. The switching power supply control circuit is configured to generate the second control signal based on the error signal.

According to Application example 3 as well, as a result of controlling the switching power supply circuit based on a sampled value of the current detection signal obtained by the sample-hold circuit, the waveform of a current flowing through the semiconductor light source approaches that of a rectangular wave, and the linearity of the average value of the current flowing through the semiconductor light source with respect to the duty ratio of the PWM signal can be improved without necessarily using a target value table that is to be set using the characteristic curve of the semiconductor light source obtained when actually driven.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described in detail with reference to the drawings. The same constituent elements are given the same reference numerals, and a redundant description is omitted.

Light Source Device

Figure 1:
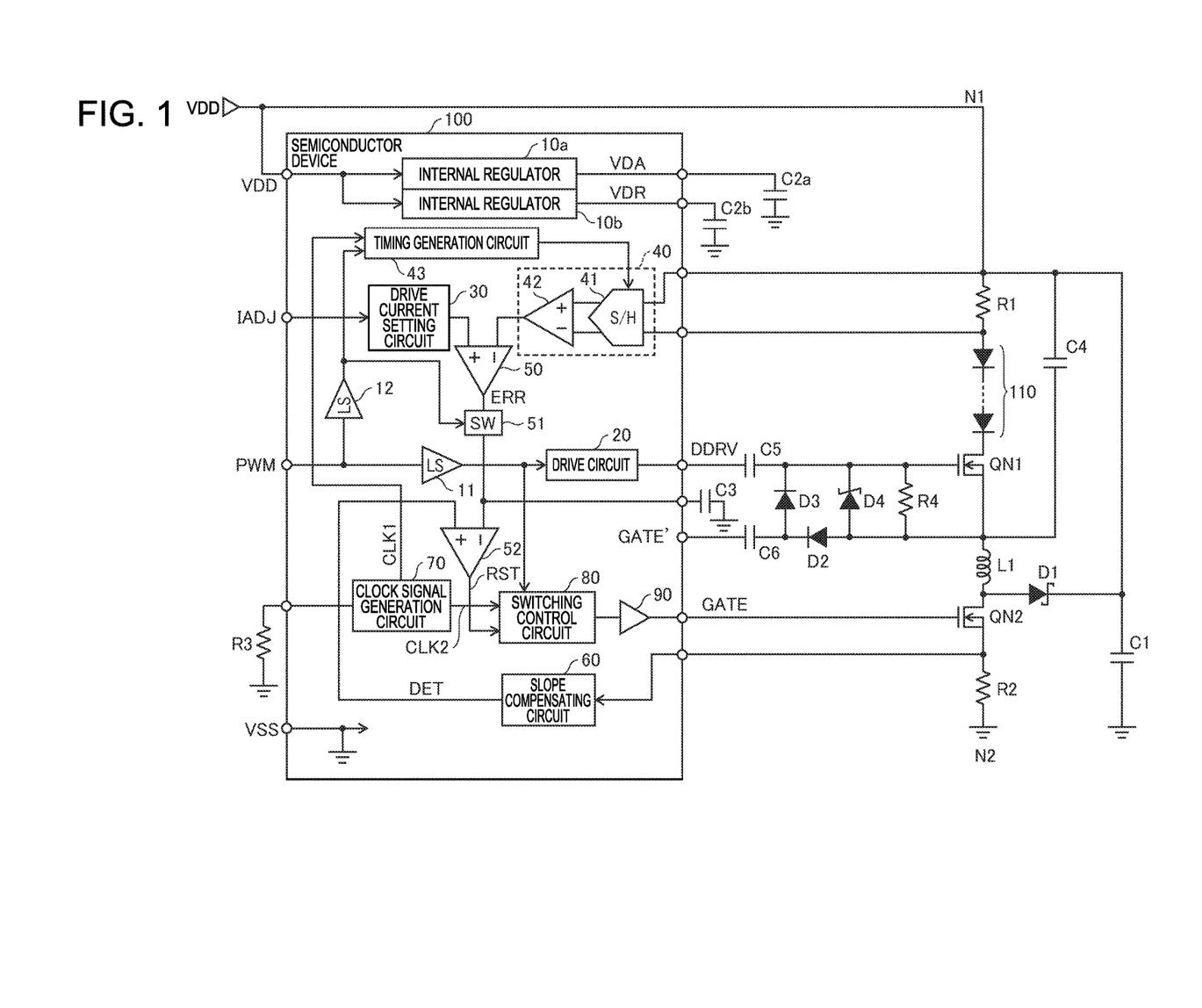
FIG. 1 is a circuit diagram illustrating an exemplary configuration of a light source device according to one embodiment of the invention.

FIG. 1 is a circuit diagram illustrating an exemplary configuration of a light source device according to one embodiment of the invention. As shown in FIG. 1, the light source device includes a semiconductor device 100, a semiconductor light source 110, N-channel MOS (Metal Oxide Semiconductor) transistors QN1 and QN2, diodes D1 to D3, a zener diode D4, an inductor L1, capacitors C1 to C6, and resistors R1 to R4.

A high-potential side power supply potential VDD (50V, for example) is supplied to a node N1 of the light source device, and a low-potential side power supply potential VSS is supplied to a node N2. FIG. 1 shows a case where the power supply potential VSS is a ground potential (0V). The resistor R1, the semiconductor light source 110, the transistor QN1, the inductor L1, the transistor QN2, and the resistor R2 are connected in series between the node N1 and the node N2.

The resistor R1 is connected between the node N1 and one end of the semiconductor light source 110, and is a current detection element that detects a current flowing to the semiconductor light source 110 and generates a current detection signal. The resistor R1 has a small resistance value of about 50 mΩ to 100 mΩ, for example. The semiconductor light source 110 includes at least one laser diode (LD), at least one light emitting diode (LED), or the like, for example, and emits light of a brightness that corresponds to the amount of a supplied current. The semiconductor light source 110 can be made using material from any material system. For example, a semiconductor material of an InGaAlP system, an AlGaN system, a GaN system, an InGaN system, a GaAs system, an AlGaAs system, an InGaAs system, an InGaAsP system, an InP system, a GaP system, an AlGaP system, an ZnCdSe system, or the like.

The transistor QN1 is a switching element that is connected in series to the semiconductor light source 110 in order to perform digital light modulation through PWM control, and has a drain connected to the other end of the semiconductor light source 110, a source connected to one end of the inductor L1, and a gate to which a first control signal DDRV is applied via the capacitor C5. The transistor QN1 is turned on when the first control signal DDRV is activated to a high level, and turned off when the first control signal DDRV is deactivated to a low level.

When the first control signal DDRV is alternatingly activated and deactivated, the transistor QN1 performs a switching operation. Therefore, by changing the duty ratio of the first control signal DDRV, the period in which a current flows through the semiconductor light source 110 can be changed. Thus, digital light modulation can be realized. Note that a P-channel MOS transistor may be used instead of the N-channel MOS transistor QN1, but, in this case, a portion of the circuit shown in FIG. 1 needs to be changed.

The transistor QN2 is a second switching element that constitutes a switching power supply circuit along with the diode D1, the inductor L1, the capacitor C4, and the like, and has a drain connected to the other end of the inductor L1, a source connected to the node N2 via the resistor R2, and a gate to which a second control signal GATE is applied. The transistor QN2 is turned on when the second control signal GATE is activated to a high level, and turned off when the second control signal GATE is deactivated to a low level.

When the second control signal GATE is alternatingly activated and deactivated, the transistor QN2 performs a switching operation. As a result of the transistor QN2 performing a switching operation according to the second control signal GATE, the switching power supply circuit supplies a current to the semiconductor light source 110 while the transistor QN1 is in an ON state.

Therefore, by changing the duty ratio of the second control signal GATE, the amount of current that flows through the semiconductor light source 110 can be changed. Thus, analog light modulation can be realized. Note that a bipolar transistor, an IGBT (Insulated Gate Bipolar Transistor), a thyristor, or the like can be used as a switching element other than the MOS transistor.

The diode D1 has an anode connected to the other end of the inductor L1 and a cathode connected to the node N1. A schottky-barrier diode or the like whose forward voltage is lower and its switching speed is higher than the PN junction diode is used as the diode D1.

The resistor R2 is connected between the source of the transistor QN2 and the node N2, and is a second current detection element that detects the current flowing through the transistor QN2 and generates a second current detection signal. The resistor R2 has a small resistance value of about 50 mΩ to 100 mΩ, for example. The capacitor C1 is connected between the node N1 and the node N2, and is for smoothing the power supply voltage (VDD-VSS). The capacitor C4 is connected between the one end of the inductor L1 and the node N1, and is for smoothing the stepped-down voltage obtained by stepping down the power supply voltage (VDD-VSS).

Semiconductor Device

The semiconductor device 100 is supplied with a PWM signal (digital light modulation signal) PWM and a current control signal (analog light modulation signal) IADJ from an external microcomputer or the like, and controls the transistors QN1 and QN2 of the light source device. Note that at least some of the constituent elements of the semiconductor device 100 shown in FIG. 1 may be discrete components or constituted by an IC external to the semiconductor device 100. Also, the diode D1, the resistor R1, and the resistor R2 may be incorporated in the semiconductor device 100.

As shown in FIG. 1, the semiconductor device 100 includes internal regulators 10a and 10b, level shifters (LS) 11 and 12, a drive circuit 20, a drive current setting circuit 30, a current detection circuit 40, a timing generation circuit 43, an error amplifier 50, a switch circuit (SW) 51, a comparator 52, a slope compensating circuit 60, a clock signal generation circuit 70, a switching control circuit 80, and a drive circuit 90.

The internal regulators 10a and 10b each include a reference voltage generation circuit constituted by a bandgap reference circuit or the like, for example, and respectively generate internal power supply potentials VDA and VDR to be supplied to internal circuits of the semiconductor device 100 based on the power supply potential VDD. The capacitor C2a is connected between an output terminal of the internal regulator 10a and the node N2, and is for smoothing an internal power supply voltage (VDA-VSS). The capacitor C2b is connected between an output terminal of the internal regulator 10b and the node N2, and is for smoothing an internal power supply voltage (VDR-VSS).

The level shifters 11 and 12 level-shift the potential of the PWM signal at a high level that is supplied from a device external to the semiconductor device 100 to potentials suitable for the internal circuits of the semiconductor device 100. The drive circuit 20 includes a driver amplifier or the like, for example, and generates the first control signal DDRV based on the PWM signal supplied from the level shifter 11.

For example, the drive circuit 20 activates the first control signal DDRV to a high level to turn on the transistor QN1 when the PWM signal is activated, and deactivates the first control signal DDRV to a low level to turn off the transistor QN1 when the PWM signal is deactivated.

The first control signal DDRV transitions between a low level (0 V, for example) and a high level (7.5 V, for example). When the first control signal DDRV is activated to a high level, a current flows from the drive circuit 20 to the gate of the transistor QN1 via the capacitor C5, the gate-source voltage of the transistor QN1 increases, and the transistor QN1 is turned on. The zener diode D4 clamps the gate-source voltage of the transistor QN1 so as to not exceed a predetermined voltage (7.5 V, for example).

A third control signal GATE' transitions between a low level and a high level in a period in which the first control signal DDRV is kept in an activated state. With this, a rectification operation is realized by the capacitor C6 and the diodes D2 and D3, and as a result, the gate-source voltage of the transistor QN1 is kept at a threshold voltage or more.

When the second control signal GATE is kept in a deactivated state for a period in which the first control signal DDRV is deactivated, the second control signal GATE can also be used as the third control signal GATE'. On the other hand, when the second control signal GATE is activated and deactivated in a period in which the first control signal DDRV is deactivated, the third control signal GATE' may be generated by an AND circuit that is provided in the switching control circuit 80 and generates a signal representing a logical product between the PWM signal or the first control signal DDRV and the second control signal GATE.

When the first control signal DDRV is deactivated to a low level, the gate-source voltage of the transistor QN1 decreases, and the transistor QN1 is turned off. The resistor R4 is for decreasing the gate-source voltage of the transistor QN1 to keep the transistor QN1 in an OFF state, when the light emitting device stops emitting light for a long period of time in a standby mode or the like.

The drive current setting circuit 30 supplies a current control signal IADJ that represents a target drive current value to a non-inverting input terminal of the error amplifier 50. When the analog current control signal IADJ is supplied to the semiconductor device 100 from an external device, the drive current setting circuit 30 including a buffer amplifier, an operational amplifier, or the like, for example, buffers or amplifies the analog current control signal IADJ that is supplied from the external device, and supplies the resultant signal to the non-inverting input terminal of the error amplifier 50.

Alternatively, when the digital current control signal IADJ is supplied to the semiconductor device 100 from an external device, the drive current setting circuit 30 including a DAC (digital to analog convertor) or the like, for example, converts the digital current control signal IADJ supplied from the external device to an analog current control signal IADJ, and supplies the resultant signal to the non-inverting input terminal of the error amplifier 50.

The current detection circuit 40 includes a sample-hold circuit 41, and may also include a current sense amplifier 42. When the PWM signal is activated, the sample-hold circuit 41 sample-holds the current detection signal (voltage across the resistor R1 for current detection) having a voltage proportional to the current flowing through the semiconductor light source 110 for a period shorter than the period in which the PWM signal is activated. The sample-hold circuit 41 has an operating speed higher than the operational amplifier, and can accurately sample and hold the current detection signal.

The current sense amplifier 42 amplifies the output signal of the sample-hold circuit 41. In order to perform high-speed operations, the sample-hold circuit 41 having a small capacitance needs to be directly connected to the resistor R1 for current detection. As a result of providing the current sense amplifier 42, the output signal of the sample-hold circuit 41 is amplified to have a sufficient voltage, and the amplified signal can be supplied to the error amplifier 50. The output signal of the current detection circuit 40 is supplied to an inverting input terminal of the error amplifier 50.

The timing generation circuit 43 generates a sampling pulse based on the PWM signal supplied from the level shifter 12, and supplies the sampling pulse to the sample-hold circuit 41. Accordingly, the sample-hold circuit 41 can be made to start the sample-hold operation at a timing at which the PWM signal is activated and a current starts to flow through the semiconductor light source 110. The timing generation circuit 43 may generate the sampling pulse using a gate delay of a logic circuit, or may generate the sampling pulse in synchronization with a clock signal CLK1 supplied from the clock signal generation circuit 70.

The error amplifier 50 generates an error signal ERR by amplifying the difference between the current control signal IADJ that represents the target drive current value and the output signal of the current detection circuit 40, and supplies the error signal ERR to the switch circuit 51. The switch circuit 51, the comparator 52, the slope compensating circuit 60, the clock signal generation circuit 70, the switching control circuit 80, and the drive circuit 90 constitute a switching power supply control circuit that generates the second control signal GATE based on the error signal ERR.

The switch circuit 51 is constituted by an analog switch or the like, for example, and is turned on when the PWM signal supplied from the level shifter 12 is activated, and is turned off when the PWM signal is deactivated. With this, the voltage of the error signal ERR that is generated when the transistor QN1 is in an ON state is held in the capacitor C3, and is supplied to an inverting input terminal of the comparator 52.

The slope compensating circuit 60 generates a detection signal DET by amplifying the voltage across the resistor R2 for current detection and adding a bias voltage thereto, and supplies the detection signal DET to a non-inverting input terminal of the comparator 52. The comparator 52 compares the voltage of the detection signal DET with the voltage of the error signal ERR, and activates the reset signal RST when the voltage of the detection signal DET is higher than the voltage of the error signal ERR.

The clock signal generation circuit 70 includes a CR oscillator circuit or the like, for example, and generates the clock signals CLK1 and CLK2 having a predetermined frequency by performing an oscillation operation. The oscillation frequency of the CR oscillator circuit is determined by the time constant whose value is a product of the capacitance value of a capacitor and the resistance value of a resistor. The resistor R3 is connected to the semiconductor device 100 as an external component in order to adjust the oscillation frequency of the CR oscillator circuit. The clock signal generation circuit 70 may generate the clock signal CLK2 by dividing the clock signal CLK1, or may output one clock signal as the clock signals CLK1 and CLK2.

The switching control circuit 80 includes an RS flip-flop or the like, for example, and generates the second control signal GATE for controlling the transistor QN2 based on the clock signal CLK2 and the reset signal RST. The second control signal GATE is applied to the gate of the transistor QN2 via the drive circuit 90 constituted by a driver amplifier or the like. For example, the switching control circuit 80 activates the second control signal GATE to a high level at a timing when the clock signal CLK2 rises. With this, the transistor QN2 is turned on.

When the transistors QN1 and QN2 are turned on, a current flows from the node N1 to the node N2 via the semiconductor light source 110, the inductor L1, and the like, the electric energy of the current is converted to magnetic energy in the inductor L1, and the magnetic energy is stored in the inductor L1. Also, when the transistor QN1 is in an off state and the transistor QN2 is in an ON state, a current flows from the capacitor C4 to the node N2 via the inductor L1 and the like, and energy is accumulated in the inductor L1.

The current flowing through the inductor L1 gradually increases over time. The voltage of the detection signal DET increases as the current flowing through the resistor R2 for current detection via the inductor L1 increases. When the voltage of the detection signal DET exceeds the voltage of the error signal ERR, the reset signal RST is activated to a high level. The switching control circuit 80 deactivates the second control signal GATE to a low level at a timing when the reset signal RST rises. With this, the transistor QN2 is turned off.

When the transistor QN1 is turned on and the transistor QN2 is turned off, the magnetic energy accumulated in the inductor L1 is discharged as electric energy, and a current flows to the semiconductor light source 110, the diode D1, and the like. Also, when the transistors QN1 and QN2 are turned off, the magnetic energy accumulated in the inductor L1 is discharged as electric energy, and a current flows to the capacitor C4, the diode D1, and the like.

In such a switching operation, when the voltage of the current control signal IADJ that represents the target drive current value increases, the duty ratio of the second control signal GATE increases, the period for which the transistor QN2 is in an ON state increases, and the current flowing through the semiconductor light source 110 increases. Accordingly, by changing the current control signal IADJ, the analog light modulation can be realized by changing the current flowing through the semiconductor light source 110.

Alternatively, the switching control circuit 80 may keep the second control signal GATE in a deactivated state for a period in which the first control signal DDRV is deactivated by generating the second control signal GATE based on, in addition to the clock signal CLK2 and the reset signal RST, the PWM signal supplied from the level shifter 11.

In this case, the transistor QN2 for analog light modulation is turned off for a period in which the transistor QN1 for digital light modulation is turned off, and a current does not flow through the semiconductor light source 110. With this, the energy accumulated in the inductor L1 can be kept from being discharged without being used to emit light, and electric power loss can be mitigated.

Exemplary Operation

Figure 2:
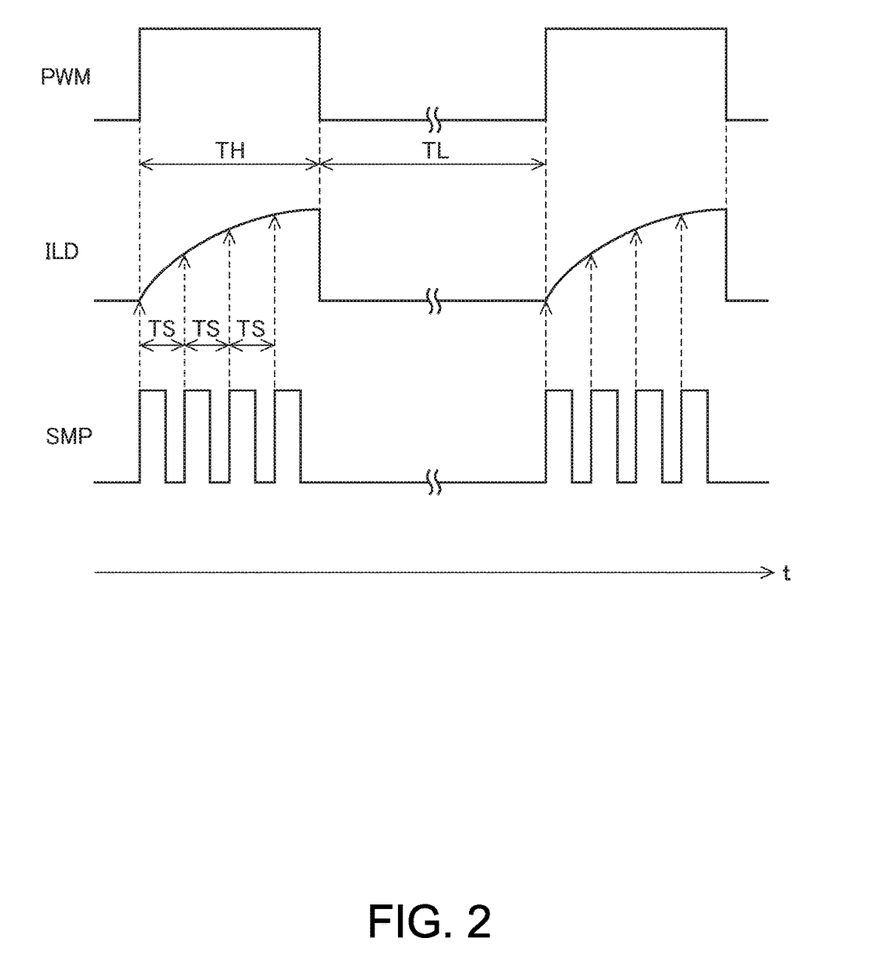
FIG. 2 is a waveform diagram for describing an exemplary operation of the light source device shown in FIG. 1.

FIG. 2 is a waveform diagram for describing an exemplary operation of the light source device shown in FIG. 1. FIG. 2 shows a waveform of the PWM signal, a waveform of a current ILD that flows through the semiconductor light source 110, and a waveform of a sampling pulse SMP. In the example shown in FIG. 2, the PWM signal and the sampling pulse SMP are activated to a high level and deactivated to a low level.

When the semiconductor light source 110 is made to emit light at the highest brightness, the PWM signal is continuously activated at a duty ratio of 100%. When the semiconductor light source 110 is made to emit light at a lower brightness, the length of a period for which a current flows through the semiconductor light source 110 is adjusted by alternatingly turning the transistor QN1 on and off according to the duty ratio of the PWM signal.

For example, when the frequency of the PWM signal is 30 kHz, the period of the PWM signal is about 33 μsec. If the duty ratio of the PWM signal is set to 50%, the activation period TH and the deactivation period TL of the PWM signal are each about 17 μsec, and the brightness of the semiconductor light source 110 is about half of the maximum brightness. If the brightness of the semiconductor light source 110 is further reduced, the duty ratio of the PWM signal is set to be smaller than 50%.

FIG. 2 shows a case where the duty ratio of the PWM signal is relatively small. In the known technology, in such a case, the waveform of the current ILD flowing through the semiconductor light source 110 is not a rectangular wave, and is a saw-tooth like waveform. As a result, the value of the current ILD flowing through the semiconductor light source 110 falls below the target drive current value, and the brightness of the semiconductor light source 110 falls below the target value.

In the present embodiment, the timing generation circuit 43 activates the sampling pulse SMP at least once in the activation period TH of the PWM signal, and keeps the sampling pulse SMP in a deactivated state for the deactivation period TL of the PWM signal. The sampling cycle TS at which the sampling pulse SMP is activated a plurality of times in the activation period TH of the PWM signal is shown in FIG. 2.

The sample-hold circuit 41 sample-holds the current detection signal having a voltage proportional to the current ILD flowing through the semiconductor light source 110 according to the sampling pulse SMP generated by the timing generation circuit 43. That is, the sample-hold circuit 41 accumulates charges supplied by the current detection signal in a capacitor in a period in which the sampling pulse SMP is activated to a high level, and generates an output signal representing the sampled value. Also, the sample-hold circuit 41 holds charges stored in the capacitor for a predetermined period after the sampling pulse SMP is deactivated to a low level, and generates an output signal representing the sampled value.

Since the sample-hold circuit 41 includes a small capacitor in order to perform high-speed operations, a configuration may be adopted in which charges held in the sample-hold circuit 41 approach zero in a deactivation period TL of the PWM signal as a result of the charges accumulated in the capacitor being naturally discharged. With this, when the PWM signal is next activated, the voltage of the output signal of the sample-hold circuit 41 can be brought to approximately zero. Alternatively, the sample-hold circuit 41 may reset the held charges in a deactivation period TL of the PWM signal. With this, when the PWM signal is next activated, the voltage of the output signal of the sample-hold circuit 41 can be brought to approximately zero.

As shown in FIG. 2, the activation period of the sampling pulse SMP is shorter than the activation period TH of the PWM signal, therefore the sample-hold circuit 41 sample-holds the current detection signal for a period shorter than the activation period TH of the PWM signal. Furthermore, the sampling period TS in the sample-hold circuit 41 is desirably less than or equal to the activation period TH of the PWM signal.

In this case, even if the activation period TH of the PWM signal is reduced, the current detection signal can be accurately sampled. For example, when the minimum value of the activation period TH of the PWM signal is about 300 nsec, the activation period of the sampling pulse SMP may be set to about 200 nsec, and the deactivation period of the sampling pulse SMP may be set to about 100 nsec.

According to the present embodiment, the sample-hold circuit 41 sample-holds the current detection signal for a period shorter than the activation period TH of the PWM signal, when the PWM signal is activated, and therefore, if the waveform of the current ILD flowing through the semiconductor light source 110 is a saw-tooth like waveform, when the duty ratio of the PWM signal is small, the sampled value of the current detection signal is smaller than the average value of the current detection signal over the sampling period TS.

Therefore, as a result of controlling the switching power supply circuit based on the sampled value of the current detection signal, the current ILD flowing through the semiconductor light source 110 increases relative to the case where the sample-hold circuit 41 is not used. As a result, the waveform of a current flowing through the semiconductor light source 110 approaches that of a rectangular wave, and the linearity of the average value of the current flowing through the semiconductor light source 110 with respect to the duty ratio of the PWM signal can be improved without necessarily using a target value table that is to be set using the characteristic curve of the semiconductor light source obtained when actually driven.

Also, when a laser diode is used as the semiconductor light source 110, laser oscillation is not induced unless the current flowing through the laser diode exceeds a critical current, but the waveform of the current flowing through the laser diode approaches that of a rectangular wave, and thus the timing at which the laser diode starts laser oscillation can be set earlier. As a result, the accuracy of the digital light modulation improves.

Here, the switching power supply control circuit generates the second control signal GATE such that the amount of increase in the current flowing through the semiconductor light source 110 when the difference between the current control signal IADJ supplied from the drive current setting circuit 30 and the output signal of the current detection circuit 40 is a second value, which is larger than a first value, is larger than the amount of increase in the current flowing through the semiconductor light source 110 when the difference between the current control signal IADJ and the output signal of the current detection circuit 40 is the first value.

In this case, the duty ratio of the second control signal GATE when the difference between the current control signal IADJ and the output signal of the current detection circuit 40 is the second value is larger than the duty ratio of the second control signal GATE when the difference between the current control signal IADJ and the output signal of the current detection circuit 40 is the first value, and the period for which the transistor QN2 is turned on (conduction time) increases. With this, the amount of increase in the current is increased as the waveform of the current ILD flowing through the semiconductor light source 110 approaches that of a saw-tooth waveform, and the waveform of the current flowing through the semiconductor light source 110 can be improved.

Projection Type Display Device

Next, a projection type display device (video projector) according to one embodiment of the invention will be described.

Figure 3:
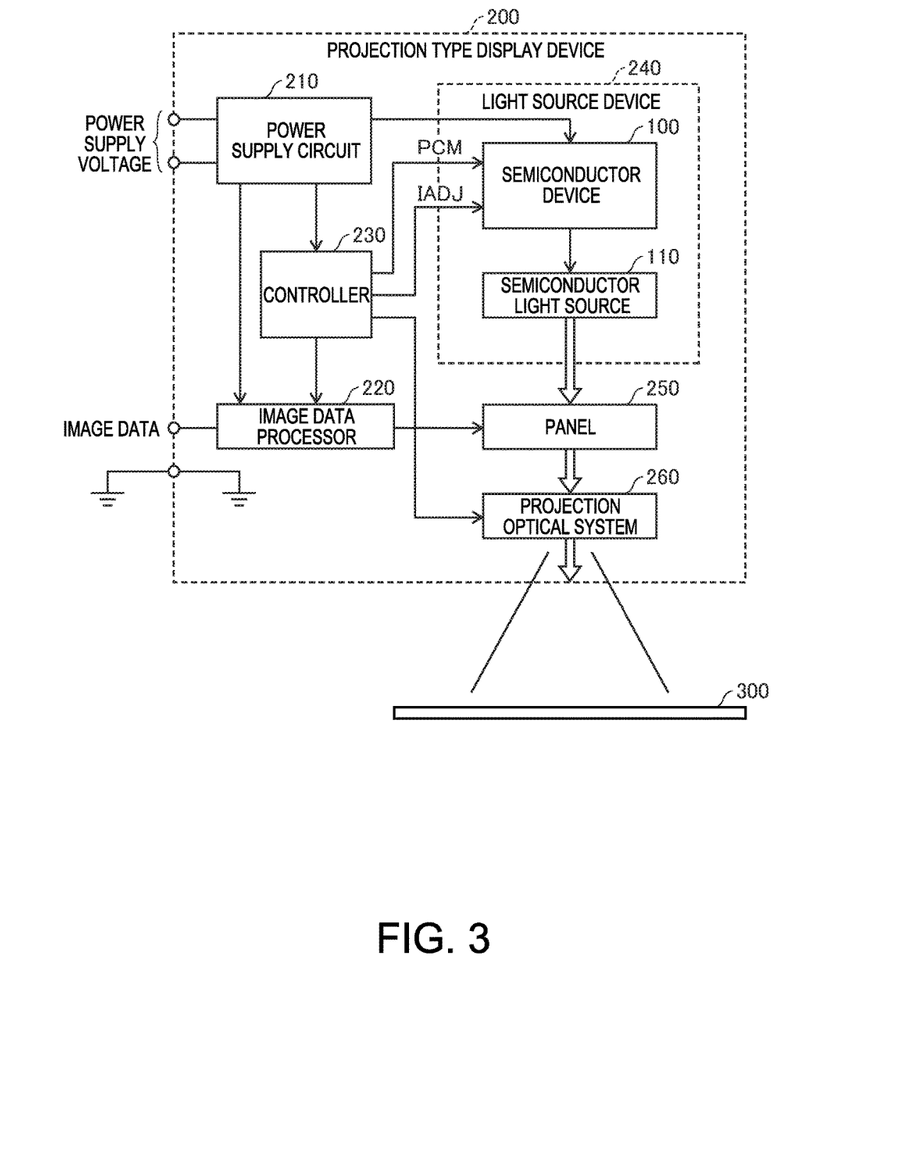
FIG. 3 is a block diagram illustrating an exemplary configuration of a projection type display device according to one embodiment of the invention.

FIG. 3 is a block diagram illustrating an exemplary configuration of the projection type display device according to one embodiment of the invention.

A projection type display device 200 is supplied with a power supply voltage from an external device, and is supplied with image data from an image data supply device such as a personal computer or a video player, and projects an image on a screen (projection surface) 300 based on the image data.

As shown in FIG. 3, the projection type display device 200 includes a power supply circuit 210, an image data processor 220, a controller 230, a light source device 240, a panel 250, and a projection optical system 260. Here, the light source device 240 is the light source device according to one embodiment of the invention, and includes the semiconductor device 100 and the semiconductor light source 110.

The power supply circuit 210 generates a DC logic power supply voltage based on a power supply voltage at 100V AC that is supplied from an external device, and supplies the generated DC voltage to the image data processor 220, the controller 230, and the like, and also generates a DC power supply voltage that is higher than the logic power supply voltage, and supplies the generated voltage to the semiconductor device 100 of the light source device 240 and the like, for example.

The image data processor 220 and a controller 230 are constituted by at least one microcomputer and the like, for example. The image data processor 220 generates an image signal for display by processing the image data supplied from an external device and a synchronization signal, and drives the panel 250 by supplying the image signal and the synchronization signal to the panel 250 for rendering an image.

The controller 230 controls the units of the projection type display device 200 according to an operation made by an operator using a remote controller or an operation panel (not shown). When the operator has instructed light modulation, the controller 230 generates the PWM signal and current control signal IADJ to realize the light modulation indicated by the operator, and supplies the generated signals to the semiconductor device 100 of the light source device 240. With this, the semiconductor device 100 controls the light emission operation of the semiconductor light source 110.

The light source device 240 emits light at a brightness that corresponds to the PWM signal and the current control signal IADJ that are supplied from the controller 230, and emits light to the panel 250. For example, if the semiconductor light source 110 includes a plurality of laser diodes that emit blue light, the light source device 240 may further include a fluorescent substance that emits yellow light upon receiving blue light emitted by some laser diodes, and a spectroscopic separator that separates red light and green light from yellow light according to the wavelength. In this case, the light source device 240 can emit light of three colors of R (red), G (green), and B (blue).

The panel 250 modulates light that is emitted by the light source device 240 according to the image signal and the synchronization signal that are supplied from the image data processor 220. For example, the panel 250 may include three liquid crystal panels corresponding to the three colors of RGB. Each liquid crystal panel forms an image by changing the light transmittance in each of a plurality of pixels that are arranged in a matrix. The modulated light modulated by the panel 250 is guided to the projection optical system 260.

The projection optical system 260 includes at least one lens. The projection optical system 260 is provided with a projection lens, which is constituted by a lens group for projecting the modulated light modulated by the panel 250 on the screen 300 to form an image thereon, and various adjustment mechanisms for adjusting the aperture of the projection lens, the zooming state, the shift position, and the like, for example. These adjustment mechanisms are controlled by the controller 230. As a result of the projection optical system 260 projecting the modulated light on the screen 300, an image is displayed on the screen 300.

According to the present embodiment, the luminance of a projected image can be highly accurately controlled using the light source device 240 in which the linearity of the average value of the current flowing through the semiconductor light source 110 with respect to the duty ratio of the PWM signal can be improved without necessarily using a target value table that is to be set using the characteristic curve of the semiconductor light source obtained when actually driven, while simplifying the circuit configuration of the projection type display device 200. With this, the adjustment of the duty ratio to be performed on each device before shipment can be omitted.

The invention is not limited to the embodiments described above, and many modifications can be made within the scope of technical idea of the invention by a person having ordinary skill in the art.

This application claims priority from Japanese Patent Application No. 2018-011315 filed in the Japanese Patent Office on Jan. 26, 2018, the entire disclosure of which is hereby incorporated by reference in its entirely.

What is claimed is:

1. A light source device comprising:
a semiconductor light source;
a switching element connected in series to the semiconductor light source;
a drive circuit configured to turn on the switching element when a first control signal based on a PWM signal is in a first logic state;
a switching power supply circuit configured to supply a current to the semiconductor light source;
a current detection element configured to detect a current flowing through the semiconductor light source and generate a current detection signal;
a current detection circuit including a sample-hold circuit that sample-holds the current detection signal for a period that is shorter than an activation period of the PWM signal, when the PWM signal is activated;
an error amplifier configured to generate an error signal by amplifying the difference between a current control signal and an output signal of the current detection circuit; and
a switching power supply control circuit configured to generate a second control signal for controlling the switching power supply circuit based on the error signal.

2. The light source device according to claim 1, further comprising a timing generation circuit configured to generate a sampling pulse based on the PWM signal, and supply the sampling pulse to the sample-hold circuit.

3. The light source device according to claim 1, wherein the sampling period in the sample-hold circuit is less than or equal to the activation period of the PWM signal.

4. The light source device according to claim 1, wherein the switching power supply control circuit is configured to generate the second control signal such that an amount of increase in the current flowing through the semiconductor light source when the difference between the current control signal and the output signal of the current detection circuit is a second value is larger than the amount of increase in the current flowing through the semiconductor light source when the difference between the current control signal and the output signal of the current detection circuit is a first value, the second value being larger than the first value.

5. The light source device according to claim 1, wherein charges held in the sample-hold circuit approach zero in the period in which the PWM signal is deactivated.

6. The light source device according to claim 1, wherein the sample-hold circuit resets charges held in the sample-hold circuit in the period in which the PWM signal is deactivated.

7. The light source device according to claim 1, wherein the current detection circuit further includes a current sense amplifier that amplifies an output signal of the sample-hold circuit.

8. A projection type display device comprising:
the light source device according to claim 1;
a controller; and
a projection optical system.

9. A semiconductor device comprising:
a drive circuit configured to turn on a switching element that is connected in series to a semiconductor light source when a first control signal based on a PWM signal is in a first logic state;
a switching power supply control circuit configured to generate a second control signal for controlling a switching power supply circuit that supplies a current to the semiconductor light source;
a current detection circuit including a sample-hold circuit that sample-holds a current detection signal that is generated by detecting a current flowing through the semiconductor light source, for a period shorter than an activation period of the PWM signal, when the PWM signal is activated; and
an error amplifier configured to generate an error signal by amplifying the difference between a current control signal and an output signal of the current detection circuit,
the switching power supply control circuit is configured to generate the second control signal based on the error signal.

* * * * *